(12) United States Patent
Zhang

(10) Patent No.: US 8,500,347 B2
(45) Date of Patent: Aug. 6, 2013

(54) KEYBOARD

(75) Inventor: Shuai Zhang, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 496 days.

(21) Appl. No.: 12/952,214

(22) Filed: Nov. 23, 2010

(65) Prior Publication Data

US 2012/0050078 A1    Mar. 1, 2012

(30) Foreign Application Priority Data

Aug. 31, 2010   (CN) .......................... 2010 1 0268137

(51) Int. Cl.
*B41J 5/00*    (2006.01)
(52) U.S. Cl.
USPC ............. 400/491; 400/481; 341/22; 200/275; 200/279
(58) Field of Classification Search
USPC ............. 341/20–22; 200/275, 279; 400/481, 400/491
See application file for complete search history.

(56) References Cited

U.S. PATENT DOCUMENTS

| | | | | |
|---|---|---|---|---|
| 4,056,700 A | * | 11/1977 | Stannek | 200/534 |
| 4,623,766 A | * | 11/1986 | Utagawa et al. | 200/85 R |
| 5,742,241 A | * | 4/1998 | Crowley et al. | 341/22 |
| 6,788,294 B2 | * | 9/2004 | Takala et al. | 345/173 |
| 2009/0148219 A1 | * | 6/2009 | Odell et al. | 400/491 |

* cited by examiner

*Primary Examiner* — Albert Wong
(74) *Attorney, Agent, or Firm* — Altis Law Group, Inc.

(57) ABSTRACT

The present disclosure provides a keyboard. The keyboard includes a number of buttons set on a pedestal. The pedestal includes a number of resisting members and a number of returning members. Each of the resisting members is arranged between two of the buttons, the inclined sidewalls of each of the resisting members is capable of respectively engaging with the buttons adjacent to the resisting member, each of the returning members corresponding to one of the resisting members returns the corresponding resisting member to its original state after the movement. When a button is pressed, the depressed button drives the adjacent resisting members to the point under the adjacent buttons to stop the adjacent buttons being depressed.

8 Claims, 4 Drawing Sheets

KEYBOARD

BACKGROUND

1. Technical Field

The present disclosure relates to computer peripheral devices and, particularly, to a keyboard.

2. Description of Related Art

When depressing a button of a conventional keyboard, the buttons adjacent to the depressed button may be simultaneously depressed by accident, especially for a relatively small keyboard, which may result in accidental activation.

BRIEF DESCRIPTION OF THE DRAWINGS

The components of the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
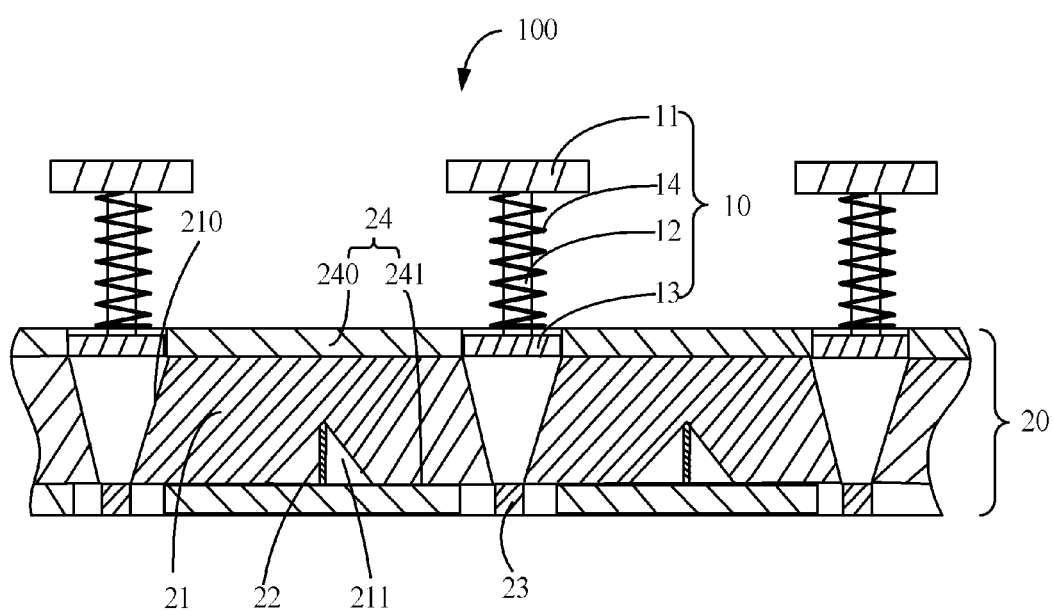
FIG. 1 is a cross-sectional view of a keyboard in accordance with a first embodiment, showing the keyboard in an original state.
Figure 2:
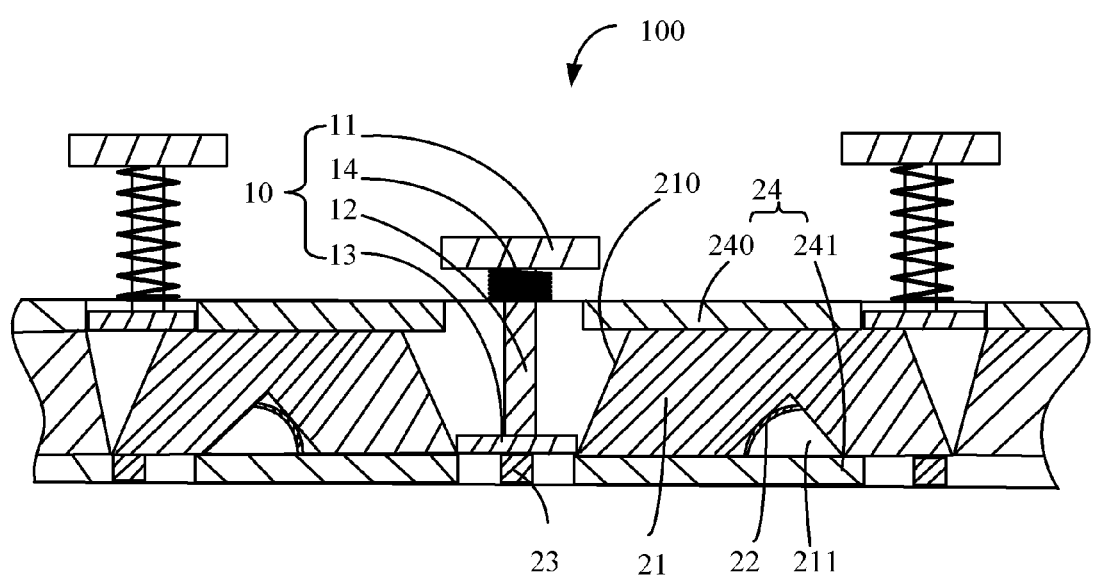
FIG. 2 is another cross-sectional view of the keyboard of FIG. 1, showing a button of the keyboard being depressed.

Referring to FIGS. 1 and 2, the keyboard 100 includes a number of buttons 10 and a pedestal 20 to receive the buttons 10. A portion of each button 10 is exposed to the pedestal 20 for operation. The pedestal 20 includes a number of resisting members 21, a number of returning members 22, and a number of conductive members 23. Each resisting member 21 is movably arranged between two adjacent buttons 10. Each resisting member 21 includes two opposite inclined sidewalls 210 capable of respectively engaging with the buttons 10 adjacent to the resisting member 21, that is, when one button 10 is depressed, the depressed button 10 can drive the resisting members 21 adjacent to the depressed button 10 to move apart from each other. Each returning member 22 corresponds to one resisting member 21 and returns the corresponding resisting member 21 to its original state after the corresponding resisting member 21 is moved. The conductive members 23 are electrically connected to a circuit board (not shown) of the keyboard 100, and each corresponds to one button 10. When one button 10 is depressed to a position where the depressed button 10 contacts the corresponding conductive member 23, the depressed button 10 is activated, and the resisting members 21 adjacent to the depressed button 10 are driven to be respectively under the buttons 10 adjacent to the depressed button 10. Therefore, when one button 10 is activated, the buttons 10 adjacent to the activated button 10 cannot be depressed any more.

In this embodiment, each button 10 includes an operable member 11, a connection rod 12, a pressing member 13 connected to the operable member 11 through the connection rod 12, and an elastic member 14 arranged over the connection rod 12. The operable member 11 is exposed to the pedestal 20 for operation. The pressing member 13 is within the pedestal 20. Two opposite ends of each elastic member 14 respectively resist the operable member 11 and the top surface of the pedestal 20 to support the corresponding button 10. In this embodiment, the elastic member 14 is a coil spring. When one button 10 is depressed to the position where the pressing member 13 of the button 10 contacts the corresponding conductive member 23, the button 10 is activated.

The keyboard 20 further includes a number of pair of sliding rails 24. Each pair of sliding rails 24 corresponds to one resisting member 21, and includes a top sliding rail 240 and a bottom sliding rail 241 separately contacting with the top surface and the bottom surface of the corresponding resisting member 21. Each resisting member 21 can slide along the corresponding pair of sliding rails 24.

In this embodiment, each resisting member 21 is substantially trapezoid-shaped. Each resisting member 21 defines a receiving space 211 with an opening (not labeled) formed on the bottom surface of the resisting member 21. In this embodiment, each returning member 22 is an elastic element received in the receiving space 211 of the corresponding resisting member 21 and with two opposite ends respectively secured to the corresponding resisting member 21 and the corresponding bottom rail 241. In this embodiment, each returning member 22 is a torsion spring. When one resisting member 21 is moved by one depressed button 10, the corresponding returning member 22 is driven to be in a compressed state. When the depressed button 10 is released, the returning member 22 returns to its original state to drive the corresponding resisting member 21 to its original state.

Figure 3:
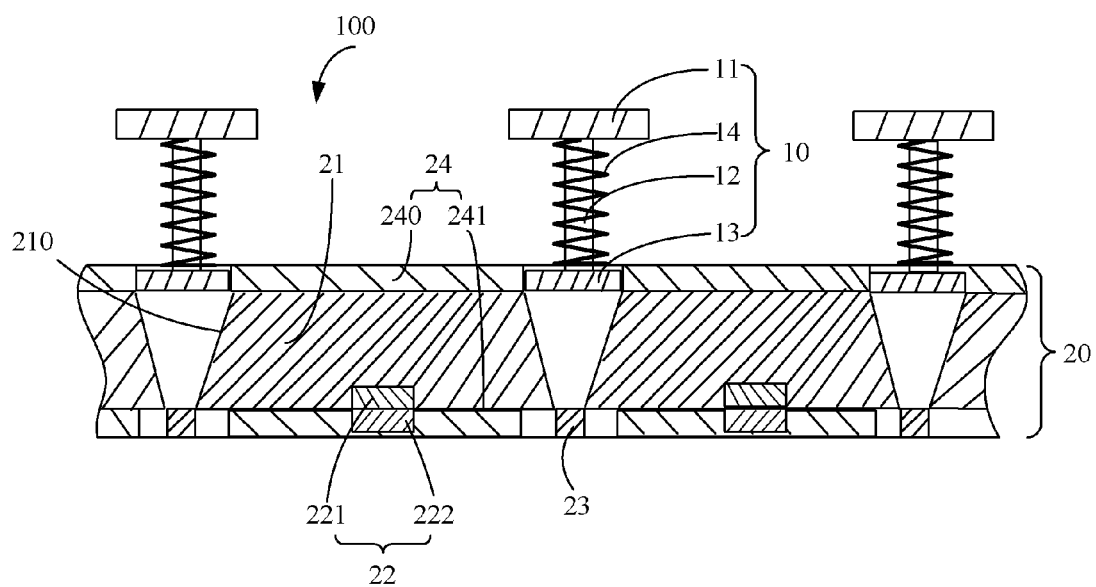
FIG. 3 is a cross-sectional view of a keyboard in accordance with a second embodiment, showing the keyboard in an original state.
Figure 4:
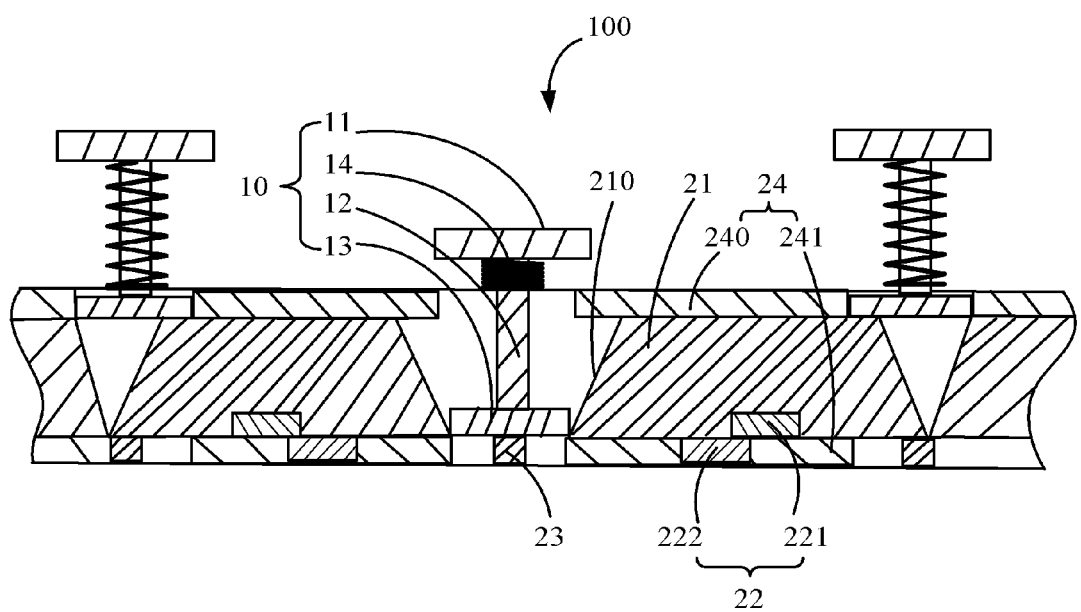
FIG. 4 is a cross-sectional view of the keyboard of FIG. 3, showing a button of the keyboard being depressed.

Referring to FIGS. 3-4, in an alternative embodiment, each returning member 22 is a pair of magnetic members 220 and 221, which attract each other. Each magnetic member 220 is mounted in the corresponding resisting member 21, and each magnetic member 221 is mounted in the corresponding bottom sliding rail 241. Each magnetic member 221 attracts the corresponding magnetic member 220 to keep the corresponding resisting member 21 in its original state. After one resisting member 21 is moved, the attraction between the corresponding magnetic members 220, and 221 returns the resisting member 21 to its original state.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A keyboard comprising:
   a plurality of buttons;
   a pedestal to receive the buttons, comprising a plurality of resisting members, a plurality of returning members, and a plurality of conductive members, each of the resisting members being arranged between two of the buttons, each of the resisting members comprising two opposite inclined sidewalls, the inclined sidewalls of each of the resisting members being capable of respectively engaging with the buttons adjacent to the resisting member, each of the returning members corresponding to one of the resisting members, and being capable of returning the corresponding resisting member to its original state after the corresponding resisting member is moved, each of the conductive members corresponding to one of the buttons;
   wherein, when one of the buttons is depressed, the depressed button drives the resisting members adjacent to the depressed button to move apart from each other, when the depressed button is depressed to a position where the depressed button contacts the corresponding conductive member, the depressed button drives the adjacent resisting members to be respectively under the buttons adjacent to the depressed button to stop the buttons adjacent the depressed button from being depressed, when the depressed button is released, the depressed button returns its original state, and the returning members corresponding the adjacent resisting members respectively return the adjacent resisting members to their original state.

2. The keyboard according to claim 1, wherein each of the buttons comprises an operable member, a connecting rod, a pressing member connected to the operable member through the connecting rod, and an elastic member arranged over the connecting rod and with two opposite ends respectively resisting the operable member and the pedestal, the operable member of each of the buttons is exposed to the pedestal for operation, and the pressing member of each of the buttons is within the pedestal.

3. The keyboard according to claim 2, wherein each of the elastic members is a coil spring.

4. The keyboard according to claim 1, wherein the pedestal further comprises a plurality of pairs of sliding rails, each of the pairs of the sliding rails comprises a top sliding rail and a bottom sliding rail separately contacting with the top surface and the bottom surface of the corresponding resisting member.

5. The keyboard according to claim 4, wherein each of the returning members is an elastic element, each of the resisting members defines a receiving space, each of the returning members is received in the receiving space of the corresponding resisting member, and opposite ends of each of the returning members are respectively secured to the corresponding resisting member and the corresponding bottom sliding rail.

6. The keyboard according to claim 5, wherein each of the returning members is a torsion spring.

7. The keyboard according to claim 4, wherein each of the returning members comprises a first magnet member and a second magnetic member which attract each other, each of the first magnetic members is mounted in the corresponding resisting member, and each of the second magnetic members is mounted in the corresponding bottom sliding rail.

8. The keyboard according to claim 1, wherein each of the resisting members is substantially trapezoid-shaped.

\* \* \* \* \*